United States Patent Office 3,743,680
Patented July 3, 1973

3,743,680
PHENOL POLYSULFIDES AND
MERCAPTOPHENOLS
Emil J. Geering, Grand Island, and George B. Stratton, Lewiston, N.Y., assignors to Hooker Chemical Corporation, Niagara Falls, N.Y.
No Drawing. Original application Dec. 30, 1968, Ser. No. 788,075. Divided and this application May 21, 1971, Ser. No. 145,959
Int. Cl. C07c 149/36
U.S. Cl. 260—609 D    14 Claims

ABSTRACT OF THE DISCLOSURE

A process is described for preparing polythiobisphenols and converting these into mercaptophenols. The reaction between a phenol and sulfur as catalyzed by iodine or bromine is interrupted before completion and the product, a phenol polysulfide mixture is reduced to mercaptophenol. A continuous process is described wherein phenol monosulfides are converted to a phenol.

This application is a division of application Ser. No. 788,075, filed Dec. 30, 1968 now abandoned.

This invention covers a novel process for preparing polythiobisphenols and for converting these into mercaptophenols. The reaction between a phenol and sulfur as catalyzed by iodine or bromine is interrupted before completion and the product, a phenol polysulfide mixture, is reduced to a mercaptophenol. The invention also covers a continuous process for preparing polythiobisphenols by converting by-product phenol monosulfides to a phenol.

The base-catalyzed reaction between a phenol and sulfur has been described in copending patent application Ser. No. 597,228, filed Nov. 28, 1966, now abandoned, and Ser. No. 666,915, filed Sept. 11, 1967, now U.S. 3,468,961 issued Sept. 23, 1969. These applications described conditions for conducting the above reaction to give phenol polysulfides in which the sulfur atoms are attached primarily in positions ortho to the phenolic hydroxyls.

Less well known is a phenol-sulfur reaction as conducted in the presence of iodine or bromine as described in the U.S. Pat. No. 3,296,310 to give thiobisphenols. The procedure described in this patent gives only a small yield of bisphenol disulfide (dithiobisphenol), the bulk of the product being thiobisphenol. Thus, according to this patent, by using an excess of phenol and by conducting the reaction at a temperature in the range 100 to 150 degrees centigrade, 90 to 96 percent of the sulfur is converted in four to eight hours. A 100 percent conversion would give a product containing only monosulfide bonds.

Phenol sulfide, i.e., sulfurized phenols, containing more than one sulfur atom per sulfur bond are unsatisfactory for most applications where they must retain their molecular integrity and in which they will be subjected to heat or to the action of nucleophilic or electrophilic reagents, because of the labile nature of the polysulfide bond. Phenol monosulfides, unlike phenol polysulfides, are suitable for example, as antioxidants for polymers and as raw materials for epoxy resins. These uses are described in the cited patent. The preparation of sulfur-rich phenol sulfides, i.e., phenol polysulfides, is not discussed.

process for preparing ortho or para mercaptophenols, for the production of phenol sulfides in which phenol rings are linked by one or more sulfur atoms. This thereby involves higher manufacturing costs in the processes of this invention and are accompanied by additional problems. For example, when sulfur chloride is the initial reactant, it may be more expensive than the sulfur reactant employed in the process of this invention. Further, the condensation of phenol and sulfur monochloride or sulfur dichloride is accompanied by the formation of hydrogen chloride as a by-product. A process for preparing phenol sulfides which includes the condensation of phenol and a sulfur chloride must therefore include steps involving special materials of construction for handling the corrosive gas, hydrogen chloride, which is evolved during the process.

The prior art process employing sulfur chloride has a disadvantage of requiring an extra step, i.e., a chlorination step to produce sulfur chlorides as well as a step for disposing of a corrosive by-product gas, hydrogen chloride. Further, the employment of a sulfur halide as a reactant, in the reaction with phenol, often results in chlorinated by-products.

A further problem with the sulfur chloride reactant is the formation of a large yield of phenol monosulfide, which is not directly reducible to the desired mercaptophenol.

From U.S. 3,296,310, it is known to employ iodine and bromine as catalysts in the reaction of phenol and elemental sulfur. However, these references or other similar references do not describe an interruption of the reaction in order to obtain a product which would subsequently give suitably high yields of ortho or para mercaptophenols.

It is an object of this invention to produce a polysulfide compound suitable for reducing to ortho or para mercaptophenol, preferably ortho.

Another object is to obtain improved yields in the process for preparing ortho or para mercaptophenols, preferably ortho.

It is a further object of this invention to eliminate the undesirable use of corrosive substances such as hydrogen chloride and to employ lower manufacturing costs in the production of ortho or para mercaptophenols.

It is also an object to continuously produce a polysulfide which can be converted to a mercaptophenol.

The objects of this invention are achieved by heating a phenol and sulfur in the presence of iodine or bromine until up to one-third of the sulfur has been expelled as hydrogen sulfide. As shown in the following equation, which is a preferred reaction, when one-third of the sulfur has been converted to hydrogen sulfide, the average sulfur bond in the organic product is a disulfide bond.

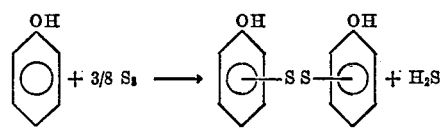

If the reaction is terminated when one-fourth of the sulfur is converted to hydrogen sulfide, the average sulfur bond will be a trisulfide. Similarly, one-fifth of the charged sulfur as hydrogen sulfide corresponds to a tetrathiobisphenol. These relationships are valid only when all of the charged sulfur has entered reaction.

The reaction between a phenol and sulfur results in a phenol polysulfide product as illustrated by the following formula:

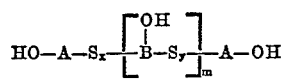

wherein A is independently selected from the group consisting of

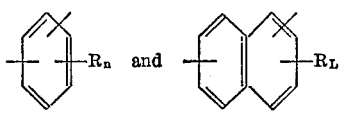

B is independently selected from the group consisting of

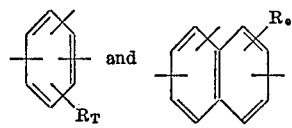

R is independently selected from the group consisting of: hydrogen; halogen; hydroxy; alkyl or alkoxy of 1 to 20 carbon atoms; alkene of 2 to 20 carbon atoms; aryloxy of 6 to 18 carbon atoms; cyclic alkyl of 3 to 20 carbon atoms; carboxy or carbalkoxy of 2 to 20 carbon atoms; carbaryloxy from 7 to 18 carbon atoms;

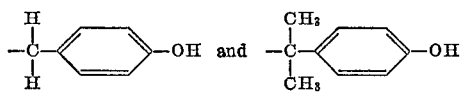

L=0 to 6; $m$ is a number from 0 to about 5; $n$=0 to 4; T=0 to 3; $e$=0 to 5; $x$ is a number from 2 to about 7.

The polythiobisphenols or phenol polysulfides of this invention produced from a phenol and sulfur in the presence of iodine or bromine have a special utility in that they are reducible to mercaptophenols. The phenolic rings are linked by a sulfur bond containing at least two sulfur atoms in order to be reducible to mercaptophenol. Thus, thiobisphenol cannot be reduced to mercaptophenol. The phenol sulfides produced as described in U.S. Pat. 3,296,310 contain only minor amounts of disulfide and can be converted only in negligible yields to mercaptophenol.

Mercaptophenols are useful compounds because they have two functional groups attached to the aromatic ring. Metallic salts of ortho mercaptophenol may be used as stabilizers for plastics such as polyethylene or polyvinyl chloride. They render the plastic less amenable to degradation by heat and light. In addition phospholane derivatives can also be used as polymer stabilizers.

The catalyst used in the reaction of a phenol and sulfur to give sulfur-rich phenol sulfides are iodine or bromine or mixtures thereof, preferably iodine.

The phenols that can be used in this reaction include phenol; alkylphenols having one or more side chains up to twenty carbon atoms, such as 2,4-dioctylphenol or dodecylphenol; chloro- or bromophenols, such as 2,4-dichlorophenol; arylphenols such as 4-benzylphenol or 4-phenylphenol; hydroxyphenols such as catechol; alkoxy- or aryloxy-phenols such as methoxy or phenoxyphenol; carboxyphenol such as salicylic acid as well as the corresponding esters, i.e., ethyl salicylate. Other suitable phenolic reagents are the naphthols and the bisphenols typified by 4,4'-isopropylidenediphenol.

The proportions of sulfur and phenol suitable to give phenol sulfides range from about 0.3 to about 3.0 gram moles of phenol per gram atom of sulfur, preferably from about 0.3 to about 2.0. A second preferred proportion is from about 0.5 to about 1.0 gram moles of phenol per gram atom of sulfur.

The quantity of catalyst which is employed ranges from about 0.01 to about 0.5 mole per mole of phenolic compound, preferably from about 0.05 to about 0.2 mole per mole. A second preferred quantity is about 0.1 mole per mole of phenolic compound.

The temperature employed in conducting the phenol sulfide reaction ranges from about 125 degrees centigrade to about 250 degrees centigrade, preferably 150 degrees centigrade to 175 degrees centigrade.

The reduction of the phenol polysulfides can be carried out by a number of methods, such as those described in copending applications Ser. No. 597,228, now abandoned and Ser. No. 666,915, now U.S. Pat. Ser. 3,468,961, issued Sept. 23, 1969. The preferred processes are, for example, the action of metals and acid, catalytic hydrogenation or reduction employing alkali metal sulfides In the process of preparing o-mercaptophenol a byproduct of phenol monosulfide is produced. Further during the distillation of orthomercapto phenol, additional phenol monosulfide is formed. These by-products of monosulfides can be converted by hydrogenolysis to phenol, a reactant and hydrogen sulfide as described in the following reaction formulas:

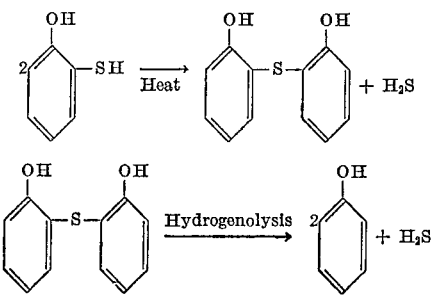

Hydrogenolysis may be effected by heating the phenol monosulfide at a temperature of about 150° C. to about 250° C., under a hydrogen pressure of about 500 p.s.i. to about 3000 p.s.i. or higher in the presence of a suitable hydrogenation catalyst, such as those described above as useful in the initial reduction step.

The following examples are to illustrate the invention; all temperatures are in degrees centigrade.

EXAMPLE 1

Reaction of phenol and sulfur as catalyzed by iodine

A stirred mixture of 940 grams (100 moles) of phenol, 320 grams (10 moles) of sulfur flowers and 7.6 grams (0.03 mole) of iodine was heated at 150 degrees for 4.6 hours, effecting the evolution of 59.6 grams of hydrogen sulfide. The unreacted phenol was removed by stripping the mixture to a temperature of 150 degrees centigrade at 10 mm. The collected phenol was 602 grams and the residue was 600 grams.

The average number of sulfur atoms (elemental and combined) per polysulfide bond, in the residue, a phenol polysulfide mixture, as calculated from the quantity of hydrogen sulfide evolved, was 4.7.

EXAMPLE 2

Conversion of a phenol polysulfide mixture of mercaptophenol

A 500 gram portion of the residue product of Example 1 (corresponds to 3.05 moles of phenol) and 33 grams of cobalt sulfide catalyst was stirred and heated at 125 degrees under 1150–2680 pounds per square inch of hydrogen pressure for 12 hours, i.e., until the hydrogen pressure was constant. After filtering off the catalyst, the hydrogenated product was distilled. The composition of the distillate was demonstrated by gas chromatographic separation and analysis of a trimethyl-silylated portion of the distillate. It contained 57 grams of phenol, 81 grams of o-mercaptophenol (27 percent yield), 96 grams of p-mercaptophenol (32 percent yield) and 16 grams of a material which the gas chromatographic elution time indicated to be m-mercaptophenol (5.3 percent yield). The gas chromatographic analyses were validated by similar analyses of authentic samples of ortho and para-mercaptophenol.

EXAMPLE 3

Conversion of phenol monosulfide to phenol

A phenol-sulfur condensation product was prepared by heating a solution of 7520 g. of phenol (80 moles) 1280 g. of sulfur flowers (40 moles) and 9.0 g. of sodium hydroxide at 180–185° for 20 hours.

Unchanged phenol was stripped off under reduced pressure. The residue remained contained 15.7 percent sulfur and had a molecular weight of 248. These analyses indicate the following average structure:

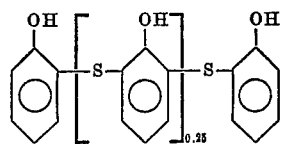

A mixture of 500 g. of this product and 339 of cobalt sulfide catalyst was heated at 200° under 2500 pounds/sq. in. of hydrogen. Hydrogen uptake occurred. After the pressure had fallen to about 800 pounds, the autoclave was vented to release hydrogen sulfide and then pressurized with hydrogen back to 2500 pounds. This procedure was repeated four times. The reaction mixture was filtered to remove catalyst and then distilled at 19 mm. Phenol, 331 g. was collected at 77–95°. This corresponds to a yield of 77.5 percent.

EXAMPLE 4

Conversion of phenol monosulfide to phenol

A composite of distillation residues from several hydrogenation runs, 520 gms., containing 99.5 g. of sulfur was heated at 200° in the same manner as in the above example. The phenol obtained, 343 g., corresponded to 81.5 percent yield.

As can be seen from the above examples, phenol polysulfides and phenol monosulfides are produced from the reaction of sulfur and a phenol. These products are reduced to mercaptophenol and a residue containing phenol monosulfides. These phenol monosulfides are then converted by hydrogenolysis to a phenol which is recycled to the first stage wherein a phenol is reacted with sulfur.

What is claimed is:

1. A process for the production of mercaptophenols comprising reacting at a temperature from about 125 degrees to about 250 degrees centigrade sulfur with a phenol selected from the group consisting of

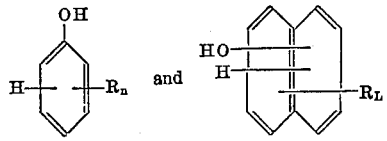

wherein R is independently selected from the group consisting of hydrogen, chlorine, bromine, hydroxy, alkyl of 1 to 20 carbon atoms, alkene of 2 to 20 carbon atoms, methoxy, phenoxy,

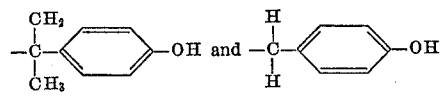

wherein $n$ is 0 to 4 and L is 0 to 6 in the presence of a halogen selected from the group consisting of bromine, iodine, and mixtures thereof, interrupting the reaction at any time up until approximately one-third of the charged sulfur has evolved as hydrogen sulfide, thereby producing a sulfur rich phenol polysulfide having at least two sulfur atoms per linkage connecting each pair of hydroxy-substituted rings of said phenol polysulfide and reducing said phenol polysulfide with a reducing agent to produce the corresponding mercaptophenol.

2. The process of claim 1 wherein the phenol-polysulfide has the formula

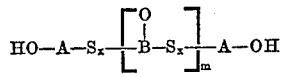

wherein A is independently selected from the group consisting of

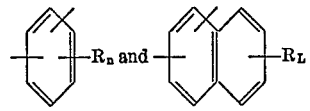

B is independently selected from the group consisting of

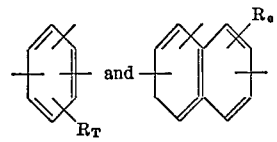

R is independently selected from the group consisting of hydrogen, chlorine, bromine, hydroxy, methoxy, alkyl of 1 to 20 carbon atoms, alkene of 2 to 20 carbon atoms, phenoxy

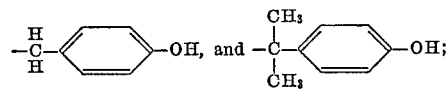

L is 0 to 6; $m$ is a number from 0 to about 5; $n$ is 0 to 4; $e$ is 0 to 5 T is from 0 to 3; $x$ is a number 2 to about 7; and the mercaptophenols are a mixture of ortho and para mercaptophenols.

3. The process of claim 2 wherein the reaction is interrupted at any time up until approximately one-fourth of the charged sulfur has evolved as hydrogen sulfide.

4. The process of claim 2 wherein the reaction is interrupted at any time up until approximately one-fifth of the charged sulfur is evolved as hydrogen sulfide.

5. The process of claim 2 wherein the reaction is operated from about 150 degrees to about 175 degrees centigrade.

6. The process of claim 2 wherein the catalyst employed is iodine.

7. The process of claim 4 wherein the catalyst employed is bromine.

8. The process of claim 2 wherein the catalyst is employed in an amount of from about 0.5 to about 2.0 moles per mole of the phenol reactant.

9. The process of claim 2 wherein the mercaptophenols are a mixture of at least about 30 percent para mercapto phenols and at least about 25 percent orthomercaptophenols.

10. A process for continuously producing a mercaptophenol, comprising (1) reacting at a temperature from about 125 degrees centigrade to about 250 degrees centigrade a phenol and sulfur in the presence of a halogen seelcted from the group consisting of iodine, bromine, and mixtures thereof, interrupting the reaction at any time up until approximately one third of the charged sulfur has evolved as hydrogen sulfide and producing a compound of the formula

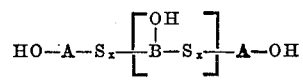

wherein
A is independently selected from the group consisting of

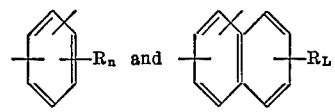

B is independently selected from the group consisting of

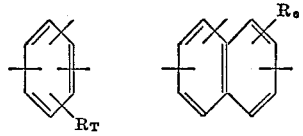

R is independently selected from the group consisting of hydrogen, chlorine, bromine, hydroxy, methoxy, alkyl of 1 to 20 carbon atoms; alkene of 2 to 20 carbon atoms; phenoxy;

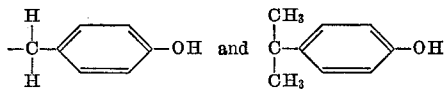

L is 0 to 6; $m$ is a number from 0 to about 5; $n$ is 0 to 4; $e$ is 0 to 5; T is 0 to 3; $x$ is a number from 2 to about 7;

(2) reducing the phenol polysulfide to mercaptophenol and a phenol monosulfide;

(3) separating the mercaptophenol;

(4) converting the phenol monosulfide to phenol; and (5) introducing the phenol from step (5) into step (1).

11. The process of claim 10 wherein steps (2) and (4) are performed by means of catalytic hydrogenation.

12. The process of claim 10 wherein the catalyst employed is iodine.

13. The process of claim 10 wherein the catalyst employed is bromine.

14. The process of claim 10 wherein the reaction is operated at from about 150 degrees to about 175 degrees centigrade.

References Cited

UNITED STATES PATENTS 3,296,310    1/1967    Gilbert _____ 260—609 F

LEWIS GOTTS, Primary Examiner

D. R. PHILLIPS, Assistant Examiner

U.S. Cl. X.R.

260—608, 609 F